Jan. 19, 1960 O. C. JORGENSEN 2,922,042
FREQUENCY DISCRIMINATOR
Filed Aug. 26, 1957
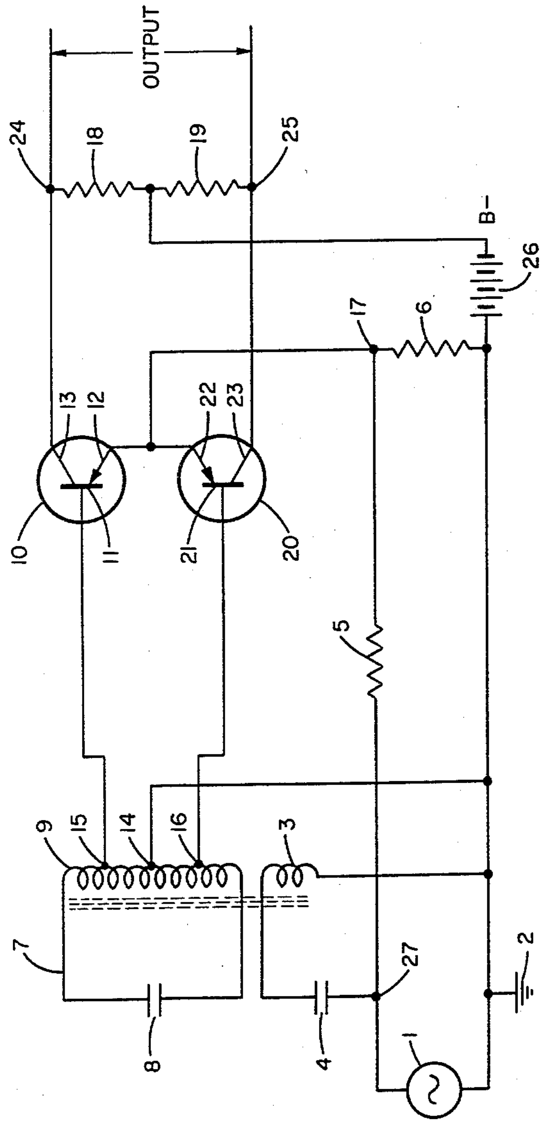
INVENTOR.
OTTO C. JORGENSEN
BY Richard G. Stahr
ATTORNEY United States Patent Office 2,922,042 Patented Jan. 19, 1960

2,922,042

FREQUENCY DISCRIMINATOR

Otto C. Jorgensen, Rochester, N.Y., assignor to General Dynamics Corporation, a corporation of Delaware Application August 26, 1957, Serial No. 680,170

4 Claims. (Cl. 250—31)

The present invention relates to frequency discriminator circuits and, more specifically, to a discriminator circuit employing transistor units.

Detectors or discriminators for phase or frequency modulated carrier or intermediate frequency waves usually employ a pair of diode rectifier units, two load resistors and resonant input impedances connected in a balanced bridge arrangement for differentially detecting deviations of the signal from a center frequency. As the recent trend has been toward the use of transistor devices in wave translating systems, the development of a simple transistor discriminator circuit is desirable.

It is an object of this invention to provide an improved discriminator circuit for angular modulated waves.

It is another object of this invention to provide a discriminator circuit utilizing transistor units.

It is another object of this invention to provide a transistorized discriminator circuit characterized by a wide frequency band response.

In accordance with this invention, a source of angular modulated signals is connected to the emitter electrodes of a pair of transistor devices and simultaneously coupled to a parallel circuit tuned to the center frequency of the angular modulated signals. The respective base electrodes are connected to taps which are located along an inductor element of the parallel tuned circuit on opposite sides of a grounded center tap. The resultant relative phase relationship of the input potential between the base and emitter electrodes of each transistor device biases the devices alternately between cut-off and full conduction, in inverse relationship, in proportion to the signal frequency deviation above and below a center frequency.

For a better understanding of the present invention, together with further objectives, advantages and features thereof, reference is made to the following description and accompanying drawing in which the figure of the drawing is a preferred embodiment of this invention.

In the figure, one side of a source of angular modulated input signals, indicated at 1, is connected to a point of reference potential 2, which may be grounded.

A series inductance-capacitance circuit, consisting of coil 3 and capacitor 4, having a reactive impedance much less than coil 3, and a resistance voltage divider network, consisting of series resistors 5 and 6, are connected in parallel to each other between the other side of signal source 1 and point of reference potential 2 at input terminal 27. Coil 3 is closely coupled to inductor element 9, of the parallel inductance-capacitance resonant circuit 7, including capacitor 8. Tank circuit 7 is tuned to the center frequency of the angular modulated input signals of source 1. Inductor 9 is provided with a center tap 14, which is connected to the point of reference potential 2, and with taps 15 and 16, each disposed on opposite sides of center tap 14, which are provided for establishing a connection between tank circuit 7 and the base electrodes 11 and 21 of transistor units 10 and 20, respectively. The transistors 10 and 20 are preferably of the PNP type.

The circuit which has been described forms a frequency discriminating network wherein the resultant phase of the potentials developed at points 15, 16 and 17, in respect to point of reference potential 2, applied to the respective base electrodes 11 and 21 and emitter electrodes 12 and 22 of transistors 10 and 20 is a function of the deviations of the angular modulated input signal above or below the center frequency.

At signal frequencies lower than the center frequency, tank circuit 7 appears inductive; therefore, the potential at point 15, on inductor 9, will be nearly 180° out-of-phase with the input potential of signal source 1 in that capacitor 4 and the tank circuit 7 each produce a 90° phase shift. As the potential at point 16, on inductor 9, is developed at a point on the opposite side of the grounded center tap 14, of inductor 9, it is 180° out-of-phase with the potential at point 15, and hence, is in phase with the input signal potential.

At signal frequencies higher than the center frequency, tank circuit 7 appears capacitive, therefore, the potential at point 15, on inductor 9, will be in phase with the input signal potential. The potential at point 16 is again 180° out-of-phase with the potential at point 15 and, hence, is also 180° out-of-phase with the input signal potential.

At the center frequency, tank circuit 7 appears resistive; therefore, the potential at point 15 is almost 90° out-of-phase with the input signal potential, capacitor 4 producing this phase shift. As has been explained before, the potential at point 16 is 180° out-of-phase with the potential at point 15 and, hence, is also 90° out-of-phase with the input signal potential.

At all input signal frequencies, the potential at point 17 is in phase with the input signal potential in that it is taken off a resistance voltage divider network consisting of series resistors 5 and 6.

To complete the discriminator circuit in accordance with this invention, the pair of type PNP transistors, indicated at 10 and 20, are connected in a parallel relationship to a direct current power supply source, indicated at 26. To provide a proper operating bias for transistors 10 and 20, the negative terminal of source 26 is connected to the collector electrodes 13 and 23 of transistors 10 and 20, respectively, while the positive terminal of source 26 is connected to the point of reference potential 2.

As has been brought out before, in the presence of an input signal, a potential will be present at points 15 and 16, of inductor 9, and at point 17, between resistors 5 and 6, all in respect to point of reference potential 2. These potentials are the resultant input potentials which are applied to the pair of transistors, the potential at point 15 being applied to base electrode 11, the potential at point 16 being applied to base electrode 21, and the potential at point 17 being applied to emitters 12 and 22 of transistors 10 and 20, respectively.

The output potential of this circuit is produced by the flow of direct current through the respective transistors and a load impedance comprised of resistors 18 and 19. The output potential is taken off between the respective collector electrodes 13 and 23, across load impedance resistors 18 and 19. It is apparent, therefore, that the polarity and magnitude of the direct current output potential will be a function of the relative current flow through transistors 10 and 20. Equal conduction through both transistors will result in an output potential of zero. At all other conditions of conduction, an output potential will appear across load impedance resistors 18 and 19, the magnitude and polarity of which is dependent upon the magnitude of current flow through either transistor relative to the current flow through the other transistor.

At all input signal frequencies except the center frequency, therefore, there must be an unequal conduction through transistors 10 and 20. This unequal conduction may be in favor of either transistor at signal frequencies below the center frequency, thereby producing an output potential of one polarity, and in favor of the other transistor at signal frequencies above the center frequency, thereby producing an output potential of opposite polarity, with the degree of unbalance being greatest at the two extreme signal frequencies and gradually diminishing to zero at the center frequency.

To illustrate the principles of this invention, the circuit of Figure 1 will be analyzed in relation to input signals at the center frequency and at the two extremes above and below the center frequency. At the low frequency extreme, as has been explained before, the potential appearing at point 15, which is impressed upon base electrode 11, is 180° out-of-phase with the potential appearing at point 17, which is impressed upon emitter electrode 12, and the potential appearing at point 16, which is impressed upon base electrode 21, is in phase with the potential at point 17, which is impressed upon emitter electrode 22. Since the base electrode must be biased negatively in respect to the emitter electrode to condition a PNP transistor, the type illustrated in the drawing, for conduction, transistor 10 will conduct over that portion of the cycle during which the potential on base electrode 11 is negative in respect to the potential on emitter electrode 12. Transistor 20, however, will not conduct at this frequency because the in-phase base electrode and emitter electrode potentials result in a potential difference of near zero, thereby precluding conduction over the complete cycle.

At the high frequency extreme, as has been brought out before, the phase relationship between the potentials appearing at points 15 and 16 are reversed in respect to point 17. Therefore, transistor 20 will conduct over that portion of the cycle during which the base electrode 21 is negative in respect to the emitter electrode 22 while the in-phase potentials of base electrode 11 and emitter electrode 12 preclude conduction of transistor 10 over the entire cycle.

At the center frequency, the potential appearing at point 17 is 90° out-of-phase with the potentials appearing at points 15 and 16. This condition results in equal conduction through the respective transistors during a cycle, resulting in a zero collector-to-collector potential difference across load impedance resistors 18 and 19.

While the present description has been in reference to type PNP transistor units, it is understood that type NPN transistor units may also be used with a reversal of polarities.

The location of taps 15 and 16, along inductor 9, is determined by the input impedance of the transistor units employed in the circuit of this invention. After the condition of impedance matching has been determined and taps 15 and 16 have been located, the resistance divider network values are selected so as to provide equal potential amplitudes at points 15, 16, and 17.

This invention provides a circuit employing a pair of transistor devices and a frequency discriminator network wherein the phase relationship of the resultant input potentials, applied between the respective base and emitter electrodes, bias the respective transistor devices alternately from cut-off to full conduction in an inverse relationship as the input signal frequency deviates above or below the center frequency. The output, therefore, is the difference potential appearing across load impedance resistors 18 and 19.

Without intending to be limited hereto, this invention has been tested and proved in a practical circuit wherein typical component values were used as follows:

| | | |
|---|---|---|
| Capacitor **4** | microfarads | .2 |
| Capacitor **8** | do | .01 |
| Resistor **5** | ohms | 200 |
| Resistor **6** | do | 47 |
| Resistor **18** | kilohms | 2.5 |
| Resistor **19** | do | 2.5 |
| Potential source **26** | volts | 24 |
| Transistors **10** and **20** | | PNP type 2N43 |

Coils 3 and 9 were wound on a single powdered iron magnetic core with a turns ratio of 1 to 50.

While I have shown and described a preferred embodiment of this invention, it will be obvious to those skilled in the art that various modifications and substitutions may be made without departing from the spirit of this invention which is to be limited only within the scope of the appended claims.

What is claimed is:

1. A discriminator comprising, a pair of transistor devices having at least base, emitter and collector electrodes, a source of supply potential, a point of reference potential, means for connecting said source of supply potential to said devices, an input terminal, a coil, a capacitor, means for connecting said coil and capacitor in series between said input terminal and said point of reference potential, a parallel resonant inductance capacitance network having a center tapped inductor, means for connecting said center tap to said point of reference potential, means for inductively coupling said coil to said center tapped inductor, means for connecting said emitter electrodes to said input terminal, a load impedance associated with said collector electrodes, and means for connecting said base electrodes to respective points on said center tapped inductor on opposite sides of said center tap.

2. A discriminator as described in claim 1 in which said load impedance is resistive.

3. A discriminator comprising, a pair of transistor devices having at least base, emitter and collector electrodes, a source of supply potential, a point of reference potential, means for connecting said source of supply potential to said devices, an input terminal, a coil, a capacitor, means for connecting said coil and capacitor in series between said input terminal and said point of reference potential, a parallel resonant inductance capacitance network having a center tapped inductor, means for connecting said center tap to said point of reference potential, means for inductively coupling said coil to said center tapped inductor, a voltage divider network, means for connecting said voltage divider network between said input terminal and said point of reference potential, means for connecting said emitter electrodes to a point along said voltage divider network, a load impedance circuit associated with said collector electrodes, and means for connecting said base electrodes to respective points on said center tapped inductor on opposite sides of said center tap.

4. A discriminator as described in claim 3 in which said load impedance is resistive.

References Cited in the file of this patent

UNITED STATES PATENTS

| | | |
|---|---|---|
| 2,462,857 | Ginzton et al. | Mar. 1, 1949 |
| 2,519,562 | Glass et al. | Aug. 22, 1950 |
| 2,637,809 | Spindler | May 5, 1953 |
| 2,857,517 | Jorgensen et al. | Oct. 21, 1958 |

FOREIGN PATENTS

| | | |
|---|---|---|
| 165,635 | Australia | Oct. 17, 1955 |